United States Patent Office 3,247,906
Patented Apr. 26, 1966

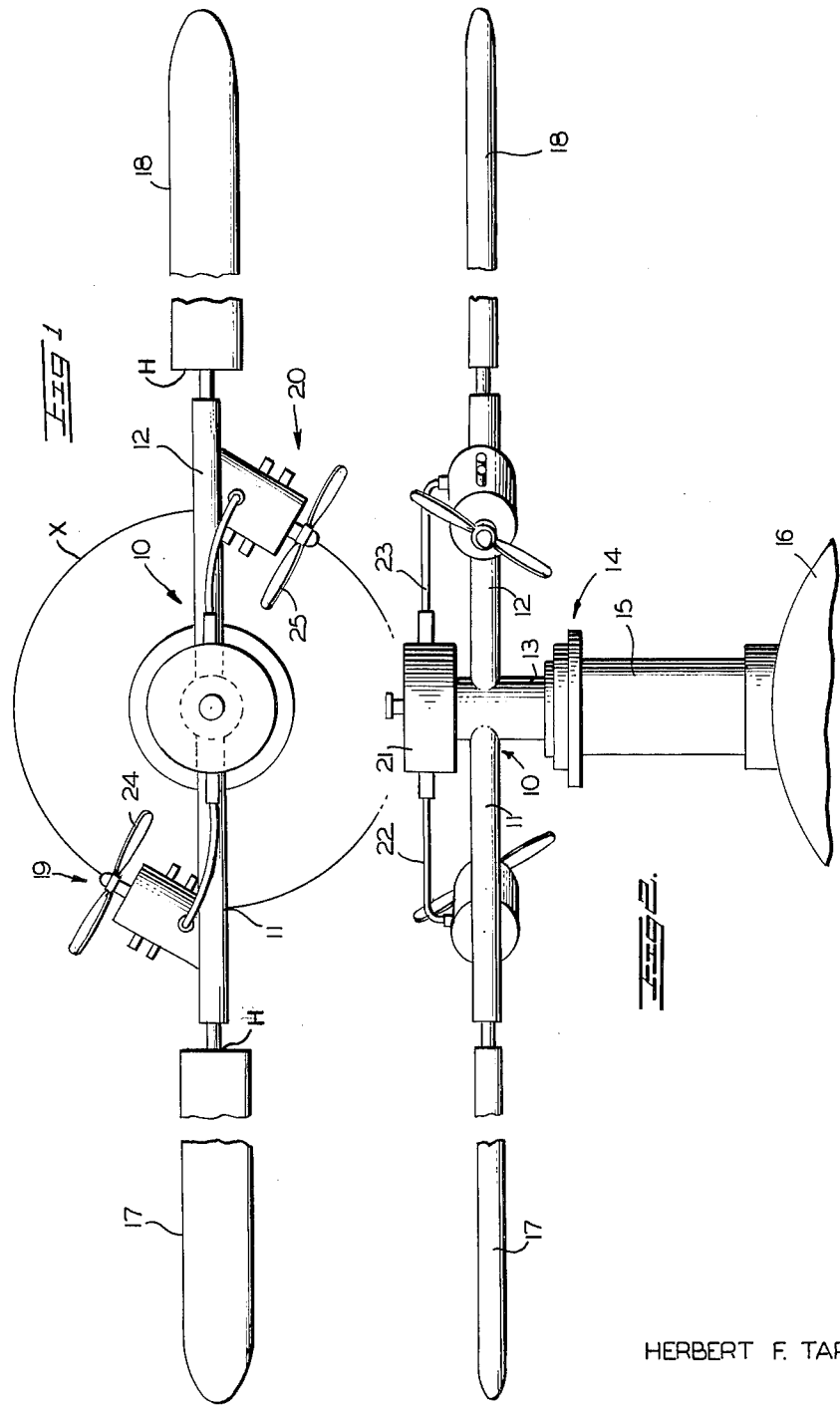

3,247,906
AIRCRAFT
Herbert F. Tappan, c/o Army Map Service 2440, Washington, D.C.
Filed Sept. 20, 1962, Ser. No. 225,005
2 Claims. (Cl. 170—135.21)

This invention relates to rotary-wing aircraft and more particularly to improvements in the location of the power plant necessary to propel the aircraft.

Conventional rotary-wing aircraft, such as helicopters, generally have the engines located inside the cabin. Although the location is generally suitable for propelling the aircraft, there are many disadvantages attendant therewith. Aside from the noise factor due to its proximity to the passengers, the servicing and maintenance thereof is difficult since the space used therefor is kept to a minimum. In addition, special equipment is employed to maintain suitable operating temperature of the powerplant.

Conventional rotary-wing aircraft with powerplants in the cabin also require tail rotors, transmissions, gearing, etc. to help overcome torque exerted on the cabin by the rotor blade rotation.

An object of this invention is to provide improvements in rotary-wing aircraft wherein the powerplants are located in a novel position.

Another object of the invention is to provide a rotary-wing aircraft wherein the powerplants are located on the wing supporting frame eliminating transmission, gearing, etc.

Other objects and advantages will be apparent to those skilled in the art from the following description of the invention.

FIG. 1 is a top view of a rotary type aircraft wing with the powerplants mounted on the supporting framework therefor in accordance with this invention; and FIG. 2 is a side elevational view of the rotary type wing and the supporting frame members of FIG. 1.

Referring to the drawing, the rotary type wing comprises a frame generally indicated by the numeral 10 and rotor blades 17 and 18, hereinafter described. The frame comprises arms 11 and 12 which are connected to hub 13 and extend radially therefrom. The hub is mounted on a bearing assembly generally indicated by the numeral 14. The frame and hub are free to rotate on the bearing assembly. A rigid tube member 15 carries the bearing assembly and connects the bearing assembly and rotary wing structure to a suitable cabin, generally indicated by the numeral 16.

Each wing includes a rotor blade 17 and 18 connected to the ends of frame arms 11 and 12 respectively, by coupling tubes 24 and 25. The blades may have flapping hinges (not shown) or other appurtenances (not shown) known to those skilled in the art. Control apparatus (not shown) therefor may also be mounted on the rotary framework members 11 and 12, the blades 17 and 18 and in the cabin as will be obvious to those skilled in the art.

Powerplants 19 and 20 are mounted on the frame arms 11 and 12 respectively. A fuel tank 21 mounted on the top of hub 13 supplies fuel to the powerplants through fuel lines 22 and 23. The powerplants may be any suitable propeller-type aircraft engines using liquid fuel from the fuel tank 21.

From the foregoing description it will be seen that the powerplants 19 and 20 are mounted upon and are carried by a horizontally rotative structure, such as the frame arms. These frame arms, together with the two propeller type aircraft engines and the fuel tank, complementally make up an assemblage having such weight that after it achieves momentum it will act in considerable measure as a fly or balance wheel and thus will aid in establishing smooth operation of the rotor blades. This is very desirable because in gusty winds and with one blade traveling with the wind and the other traveling against the wind, a high degree of vibration develops in the rotor blades. The balance wheel effect provided by the bodily rotation of the engines dampens this vibration and gives much smoother operation than can be had by any known construction.

Further, the described balance wheel mass is of great help in providing safe and smooth landings. In effecting power-off descents with known type helicopters, the up-rushing wind keeps the rotor blades in motion. With skillful angling of the blades some of this motion can be converted into lift and thereby moderate the rate of descent. Upon making a landing, the pilot, when at an elevation of about one hundred feet provides an operation known as "flare-out." This consists of angling the blades to convert most of the inertia into lift. Although the rotation speed is reduced, "flare-out" nevertheless checks the rate of descent and effects a soft landing. The momentum stored up in the flywheel assembly of engines, rotating frame and fuel tank adds to the degree to which the pilot can angle his blades to effect lift without them ceasing rotation. Thus, the cushioning effect can be increased to a very marked degree and much softer landings can be had.

An additional feature of advantage resides in the gyroscopic effect of the bodily rotating mass represented by the arms and the engines and fuel tank. This gives increased stability to the aircraft as a whole. Thus there is provided an arrangement which is compact, very economical to construct and avoids the use of elongated struts and braces such as must be used where the engines are located upon rotor wings at a considerable distance outward from the axis about which the wings rotate. See the supporting braces 24, for example, shown in the patent to Isacco 1,669,758 of May 15, 1928.

The powerplants each include a housing with a base 26 and 27, respectively, and each base is angled so that when secured to its respective radial arm 11 or 12, the axes of each propeller shaft 28 and 29 of each respective powerplant are substantially parallel to each other and are each angularly disposed with respect to the axes of the mounting framework arms 11 and 12. Also, as shown in FIGURES 1 and 2 of the drawing each powerplant is positioned on its respective radial frame arm on alternately opposite sides. During operation the compact nature of the frame work arms and the power means provide a minimum exposure to wind resistance and the full effect of the thrust lines generated by each powerplant, whereby a constant thrust results for each complete 360 degrees of rotation of the rotor blades.

Also, if more than one powerplant is used, by angularly mounting the powerplants on opposite sides and facing in opposite directions along each side of a diametrical line within a compact area of framework rotation, the thrust produced by the propellers 24 and 25 of the power means will impart a maximum energy with minimum air drag to rotate the rotor blades 17 and 18 carried by the revolvable framework 10. By placing the lifting surfaces at the extremities of the frame arms 11 and 12 and the powerplants closer to the hub 13 and center of rotation along a diametrical line, the rotor blades move at considerably greater velocity than the relatively slower velocity of the hub 13 and the engine frame arms 11 and 12 of the circle of rotation X, see FIGURE 1. Thus by mounting the powerplants on radial arms as close as possible to the center hub 13 with allowance for propeller clearance, minimum air drag is provided and the problems attendant to the mounting of the heavy powerplants on the wings is eliminated.

Various other means used to control the rotation of the wing, the rotor blades, the powerplants, etc. are not shown. However, these means will be obvious to those skilled in the art.

It is also understood that the invention is not limited to a wing with only two rotor blades. Thus, a rotating wing with 3, 4, or more blades can be used.

It is apparent that various changes may be made without departing from the scope of the following claims.

What is claimed is:

1. A power system for a rotary wing aircraft, said aircraft comprising a rotor having a hub, radial arms extending diametrically outward from said hub, rotor blades carried by the said arms, said inboard ends of the said blades being spaced radially from said hub closely adjacent thereto whereby said arms are exposed to provide a mounting area, powerplant means mounted on said mounting area of each arm, said powerplant means including propeller means each with a hub, said last named means being mounted with their respective hubs in oppositely facing directions each on an opposite side of one of said diametrically extending arms, a fuel supply tank mounted on said rotor hub, and fuel feed lines from said supply tank to said powerplants, said powerplant means each having angular base portions secured to said exposed mounting area of each of said arms, whereby said propellers have their inboard ends at maximum proximity to the said rotor hub.

2. Aircraft of the helicopter type comprising a passenger carrying part, a supporting member upstanding therefrom, bearing means carried by the supporting member, a frame mounted for rotation in a substantially horizontal plane by said bearing, said frame comprising a hub portion and a plurality of arms extending radially from said hub portion and rigid with respect thereto providing support arms with inboard and outboard portions, a rotor blade having its inner end connected to the outboard portion of each of said arms; and powerplant elements of the propeller type mounted upon the inboard portion of each of said arms at points on the inboard portions of said arms between the said hub and the point of attachment of the rotor blades to the respective outboard portions of said arms, whereby all operative connection of said rotor blades to the respective outboard portions of said arms is independent of the powerplant elements mounted on the respective inboard portions of said arms, said powerplant elements each having angular base portions secured to said inboard portions of each of said arms, whereby said propellers have their inboard ends at maximum proximity to the said rotor hub.

References Cited by the Examiner

UNITED STATES PATENTS

| 1,669,758 | 5/1928 | Isacco | 170—135.21 |
| 1,924,192 | 8/1933 | Kusse | 170—135.21 |
| 2,268,552 | 1/1942 | Rhines | 170—135.21 |
| 3,013,746 | 12/1961 | Siebenthal | 244—17.11 |

FOREIGN PATENTS

| 559,984 | 3/1927 | Germany. |
| 16,791 | 1915 | Great Britain. |

MARK NEWMAN, Primary Examiner.

EMILE PAUL, JULIUS E. WEST, Examiners.